United States Patent [19]
Mokrani et al.

[11] 3,903,475
[45] Sept. 2, 1975

[54] ELECTRICAL OVERLOAD PROTECTION DEVICE

[75] Inventors: Edmond Eugene Mokrani, Chilly Mazarin; Jean-Louis Joseph Lefaucheux, Paris, both of France

[73] Assignee: Societe Anonyme de Telecommunications, Paris, France

[22] Filed: Feb. 14, 1974

[21] Appl. No.: 442,352

[30] Foreign Application Priority Data
June 28, 1973 France .............................. 73.23657

[52] U.S. Cl. .......................... 323/9; 317/20; 323/25
[51] Int. Cl.² .......................................... G05F 1/58
[58] Field of Search ............... 317/20; 323/9, 23, 25

[56] References Cited
UNITED STATES PATENTS

| | | | |
|---|---|---|---|
| 3,262,015 | 7/1966 | McNamee et al. | 317/20 |
| 3,529,210 | 9/1970 | Ito et al. | 317/20 |
| 3,697,860 | 10/1972 | Baker | 323/25 X |
| 3,793,580 | 2/1974 | Baker | 323/25 X |

*Primary Examiner*—A. D. Pellinen
*Attorney, Agent, or Firm*—Flynn & Frishauf

[57] ABSTRACT

The voltage across a low series resistance on the d.c. power supply side of the protective device is compared with a fixed voltage to produce a signal to put a first transistor switch provided in series between the low resistance and the load into saturated condition so long as the voltage across the low resistance does not exceed the fixed voltage. In parallel with the controlled path of the first transistor switch is the series combination of a higher protective resistance and a second transistor switch which is maintained in the saturated condition so long as the load is drawing current, which is to say even during a short period overload in which the rise of voltage across the low series resistor has caused the blocking of the first transistor switch. A timing circuit is provided which upon the persistence of an overload which shuts down the first transistor switch for a predetermined time for a few seconds will activate the control circuit to disconnect the load. The control circuit is arranged to connect the load by turning on the second and then the first transistor switch in response to an external signal and to disconnect the load by turning off the first and then the second transistor switch either in response to an external signal or in response to the timing circuit indicating a prolonged overload.

3 Claims, 4 Drawing Figures

FIG.3

ELECTRICAL OVERLOAD PROTECTION DEVICE

BACKGROUND OF THE INVENTION

The invention concerns a method of supplying current to variable impedances from a general energy distribution line.

The invention may, in particular, be advantageously applied to the supply of apparatuses for operation or control on board aircraft where overvoltages or sudden falls in impedance frequently occur, simultaneously or together.

The apparatuses require protection and are supplied with current from a general distribution line through a device for the limitation of current.

The object of the invention is to produce an effective and inexpensive device for the limitation of current and for switching out the connected apparatus after a predetermined period of current limitation.

SUMMARY OF THE INVENTION

The device for carrying out the method according to the invention has a low impedance in normal operation conditions, which allows a potential almost equal to that of the general distribution line to be available at the terminals of the apparatus. In the case of overloading, for instance the occurrence of an overpotential in the general distribution line and/or a sudden fall in the impedance of one of the apparatuses supplied, the impedance of the device according to the invention increases strongly and allows the current supply to be limited to a maximum value which cannot damage the apparatus except on prolonged duration and then, if the current limitation operation is required to be prolonged more than a few seconds, the apparatus protected is switched out.

The invention thus permits apparatuses of variable impedance to be supplied with direct current which remains less than or equal to a limiting value whenever the apparatus is in circuit, while taking the apparatus out of circuit in case of prolonged limit-value current.

The device for carrying out the invention is connected between the distribution line and the load and includes a low resistance connected in series with a parallel circuit, the first branch of which includes a first transistor whose emitter-collector circuit is connected in series with the said resistance and whose base is fed by a differential amplifier comparing the potential across the terminals of the said resistance with a fixed potential, the values of the low resistance and of the fixed potential being so chosen that the transistor operates in the saturated state in normal conditions and in the non-saturated state when overloading occurs, and the second branch of which includes a second transistor whose collector-emitter circuit is connected in series with a second, high, resistance, the base of this second transistor receiving a fixed potential which is sufficiently high to maintain this transistor permanently in the saturated state as long as the apparatus or load is effectively in circuit.

This device also includes an external control circuit for effectively connecting and disconnecting the load.

The present invention will be better understood on the basis of the following description of one particular form of embodiment, given as an example, and illustrated by the attached drawings:

DETAILED DESCRIPTION OF THE PREFERRED EMBODIMENT

Figure 1:
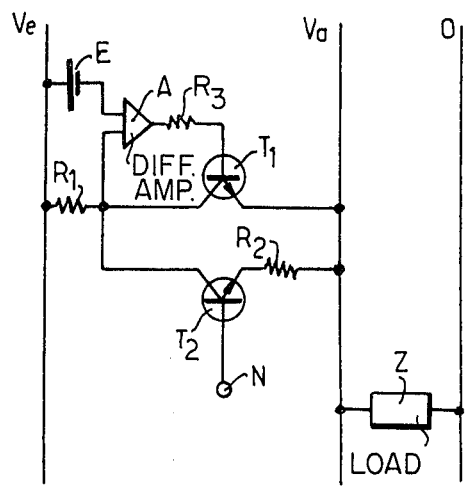
FIG. 1 is a diagram intended to explain the principle of the process according to the invention.

FIG. 1 is a diagram illustrating the principle of the device employed to carry out the invention. The general distribution line supplies a potential $V_r$. An apparatus fed from the general distribution line is represented as a load with impedance Z. The potential at the terminals of the load is denoted by $V_a$.

The device according to the invention for limiting the current is connected between the distribution line and the load Z.

In principle one device according to the invention is provided for each apparatus supplied but it is not excluded that several apparatuses, connected in parallel, may be protected by means of a single device.

The device according to the invention includes a first, low, resistance R1 connected to the general distribution line and connected in series with a parallel circuit whose first branch includes a variable impedance, that is a first transistor T1, and whose second branch includes a fixed impedance, that is a second transistor T2 in whose emitter circuit there is connected a second, high, resistance R2 connected to the load Z. The base of this second transistor always receives, through the terminal denoted by N, a relatively high potential which maintains this transistor permanently in the saturated state while the load Z is drawing current. The base of the first transistor T1 is connected to the output of a differential amplifier A whose two inputs receive, respectively, the potential at the terminals of the resistance R1 and a fixed reference potential E. This potential E is chosen in such a way that, in normal operation, that is in the case in which neither an overpotential nor a sudden fall in the impedance of the load is present, the output signal of the differential amplifier A has a high level so that the transistor T1 operates in the saturated state. In this case, the operation of the device is as follows:

Let $I_a$ be the current supplied to the load, and $I_{E1}$, $I_{E2}$ the emitter currents of the transistors T1 and T2, then:

$$I_a = I_{E1} + I_{E2}$$

The transistors T1 and T2 operating in the saturated state, their emitter currents are given by:

$$I_{E1} = s_1 V_{CE1} \qquad (1)$$

$$I_{E2} = s_2 V_{CE2} \qquad (2)$$

$V_{CE1}$ and $V_{CE2}$ being the collector-emitter potentials of the transistors T1 and T2 and $s_1$ and $s_2$ being the saturation coefficients of these transistors. The following relation also holds:

$$V_e - V_a = R1 \cdot I_a + V_{CE1} = R1 \cdot I_a + V_{CE2} + R2 \cdot I_{E2}$$

Since the resistance R1 is low, the quantity $R1 \cdot I_a$ can be neglected, which gives:

$$V_e - V_a \approx V_{CE1}$$
$$\approx V_{CE2} + R2 I_{E2}$$

Now $\quad V_{CE2} = \dfrac{I_{E2}}{s_2}$ (3)

which gives $\quad V_e - V_a \approx I_{E2}(\dfrac{1}{s_2} + R2)$ or $\quad I_{E2} \approx \dfrac{(V_e - V_a) s_2}{1 + s_2 R2}$ Since the resistance R2 is very high, we have $s_2 R2 >> 1$, as a result:

$$I_{E2} \approx \dfrac{V_e - V_a}{R2} \quad (4)$$

On the other hand, since the impedance of the load is Z, we have:

$$V_a = Z I_a = Z(I_{E1} + I_{E2})$$

or, by Equations 1 and 4:

$$V_a = Z \left( s_1 V_{CE1} + \dfrac{V_e - V_a}{R2} \right)$$

Taking Equation 3 into account, we can write:

$$V_a = Z \left[ s_1 (V_e - V_a) + \dfrac{V_e - V_a}{R2} \right]$$

or $\quad \dfrac{V_e - V_a}{V_a} = \dfrac{1}{Z(s_1 + \dfrac{1}{R2})}$ when it is arranged that $Z(s_1 + 1/R2) >> 1$ it results that:

$$V_a \approx V_e$$

Thus, in normal operating conditions, when there are no perturbations and the two transistors T1 and T2 are in the saturated state, the potential of the supply is approximately equal to the potential of the distribution line.

On the other hand, when a high overpotential occurs in the distribution line or a sudden fall in the impedance of the load takes place, the current $I_a$ tends to increase strongly so that the potential $R1 \cdot I_a$ increases and tends towards the value E, which brings about a decrease in the output signal $K(R1 \cdot I_a - E)$ of the differential amplifier A, K being a constant corresponding to the gain of the amplifier. In this case, the transistor T1 which receives a lower base current no longer operates in the saturated state, but in the normal state, in which we have:

$$I_{E1} = \beta I_{B1}$$

$I_{B1}$ being the base current and $\beta$ the current gain of the transistor. Now, we have the relation:

$$I_{B1} = K(R1 \cdot I_a - E)$$

so that we can write:

$$I_{E1} = \beta K(R1 \cdot I_a - E)$$
$$= \beta K(R1 \cdot I_{E1} + R1 \cdot I_{E2} - E)$$

$$I_{E1} = \dfrac{\beta K(R1 \cdot I_{E2} - E)}{1 - \beta K R1}$$

Since the product $\beta K$ is much greater than 1, this becomes:

$$I_{E1} \approx \dfrac{E - R1 \cdot I_{E2}}{R1}$$

or $$I_{E1} \approx \dfrac{E}{R1} - I_{E2} \quad (5)$$

from whence the equation:

$$I_a = I_{E1} + I_{E2} \text{ becomes}$$

$$I_a \approx \dfrac{E}{R1} - I_{E2} + I_{E2}$$

$$I_a \approx \dfrac{E}{R1}$$

As a result, when it is desired to limit the current $I_a$, in the case of an overpotential or of a fall in the impedance of the load, to a limiting value $I_c$, it is sufficient to choose $E = R1 \cdot I_c$.

When $I_a \rightarrow I_c$, which is the case when, in particular, the impedance $Z \rightarrow 0$, the input potentials of the differential amplifier A become equal and its output potential is at a low level. This low level signal is not sufficient to supply the transistor T1, which is blocked. Whence $$I_{E1} = 0$$

and $$I_{E2} = I_c$$

Given that the distribution line may be simultaneously affected by an overpotential $V_s$, which may, for instance, have a value equal to three times the normal potential $V_e$, it will be convenient to choose the resistance R2 such that $$R2 = \dfrac{V_s}{I_c}$$

Figure 2:
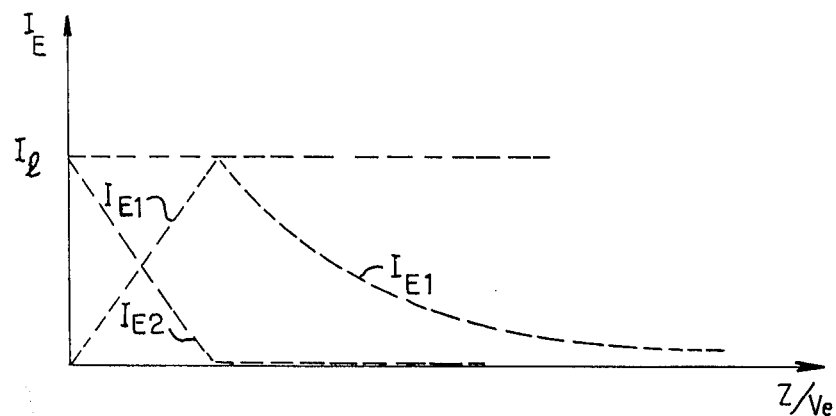
FIG. 2 is a graph showing the variation of the emitter currents of the two transistors in the circuit illustrated in FIG. 1.

FIG. 2 shows the variation in the emitter currents $I_{E1}$ and $I_{E2}$ of the transistors T1 and T2 as a function of the ratio of the impedance of the load Z to the potential $V_e$ of the distribution line for $$R2 = \dfrac{V_e}{I_c}.$$

Figure 3:
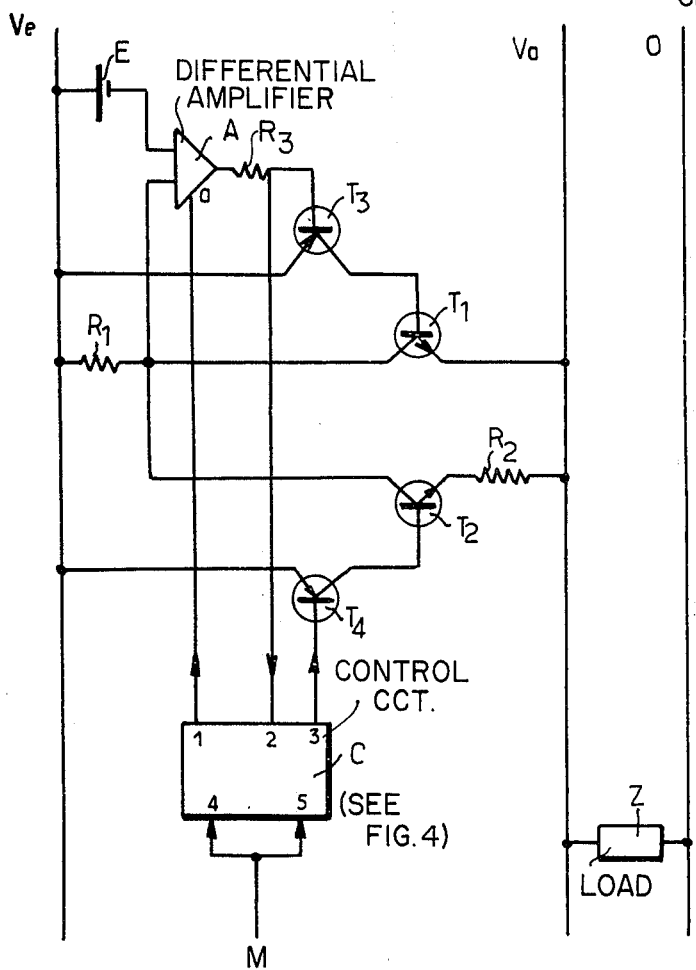
FIG. 3 illustrates a preferred form of embodiment of the device according to the invention.
Figure 4:
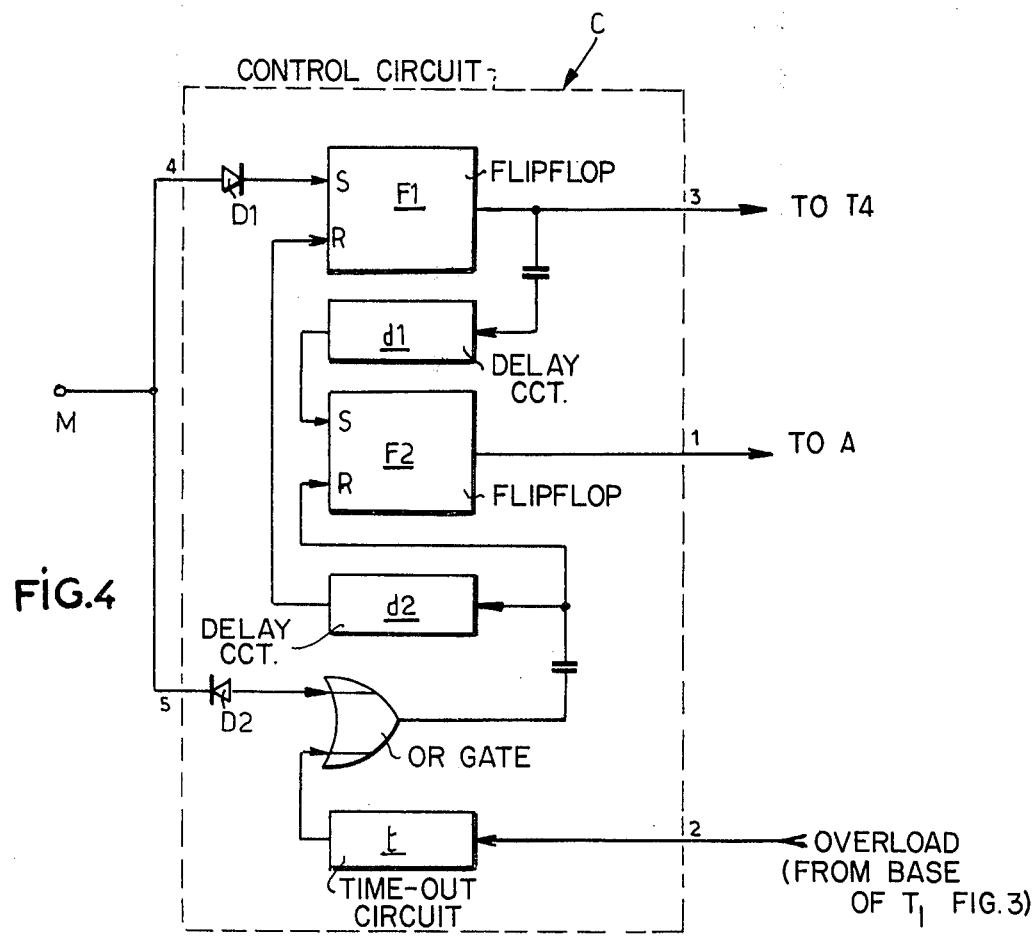
FIG. 4 is a circuit diagram of the external control block.

FIG. 3 illustrates a preferred form of embodiment including a logical junction block or external control block C which allows, inter alia, the connection or disconnection of the load from the exterior. This block includes three inputs, denoted by the reference numbers 2, 4, 5, which are, in fact, reduced to two, that is 2 and M, given that the external start-stop control is effected through a single terminal M, by the application of a positive or negative potential which is switched by means of diodes as illustrated in FIG. 4. This block also includes two output terminals 1, 3.

The input M is connected to an external circuit (not illustrated) which allows the connection or disconnection of the load apparatus. The input 2 is connected to the output of the differential amplifier which can give an indication of overloading, represented by a low level signal. The output 1 is connected to an external control terminal $a$ of the differential amplifier A and the output terminal 3 is connected to the base of the transistor T2.

In the preferred form of embodiment illustrated in FIG. 3, two supplementary transistors T3, T4, operating as amplifiers, have also been provided. The transistor T3 serves to amplify the output current of the differential amplifier A in order to apply it to the base of the transistor T1. With this object, the base of the transistor T3 is connected to the output of the differential amplifier A, while its emitter and its collector are connected, respectively, to the general distribution line and to the base of the transistor T1. The transistor T4 serves to amplify the base current applied to the transistor T2. The base of this transistor T4 is connected to the output terminal 3 of the control block C, and its emitter and collector are connected, respectively, to the general distribution line and to the base of the transistor T2. A resistor R3 is inserted between the output of differential amplifier A and the base of transistor T, to limit the base current and steady the base voltage in the saturation condition of the transistor.

The method of operation of the control block C will now be described with reference to FIG. 4. This block essentially includes two flip flop circuits F1, F2, two delay circuits $d1$, $d2$, one OR-gate, and one timing circuit $t$.

The command for connecting power to the load is applied to the terminal M in the form of a positive pulse which is transmitted by the diode D1 to the terminal S to set the flip flop circuit F1. The output signal of the flip flop circuit in its set condition has a high level and, is sent, on the one hand, to the terminal 3, which is connected to the base of the transistor T4, which becomes conducting and saturates the transistor T2, and, on the other hand, to the terminal S which sets the second flip flop circuit F2, through the intermediate delay circuit $d1$, which imposes a delay just greater than the time of increase of the output signal of the transistor T2. The output signal of the flip flop circuit F2, which likewise has a high level for the set condition of the flip flop, appears at the output terminal 1 of the control circuit C and is applied to the control terminal $a$ of the differential amplifier A, which is enabled, while the flip flop F2 remains set, to supply a high level signal to the transistor T3 to saturate the transistor T1 so long as there is no overload. The device according to the invention is thus engaged and is ready to limit the current, in the manner described above, in the case in which overloading occurs.

The disconnection of the load may be caused in two ways. It may occur either after an external command, in the form of a negative pulse applied to the terminal M, or after overloading of a relatively long duration.

The application of a negative pulse to the terminal M, this pulse being transmitted by the diode D2, causes a high level signal to appear at the output of the OR gate, this signal being transmitted, on the one hand, to an input R to reset the flip flop circuit F2 into the rest state which gives a low level blocking signal at terminal 1, which is applied to disable the differential amplifier A. The differential amplifier A then is constrained to give a low level signal which blocks the transistor T3 and thereby the transistor T1. The output signal of the OR-circuit is also led, on the other hand, to an input R, which resets the flip flop circuit F1 into the rest state, through the intermediate delay circuit $d2$ which imposes a delay just greater than the decay time of the conducting condition of transistor T1. The low level output signal of the flip flop circuit in the rest state then blocks the transistor T2 through the intermediate transistor T4.

The disconnection of the load according to the invention can also be brought about by overloading of a long duration, which necessitates the cutting-off of the supply of electric power. For this purpose, the output signal of the differential amplifier A is applied to the OR-circuit, through the intermediate time circuit $t$. The delay imposed by the circuit $t$ is of the order of 2 to 3 seconds. When an overload appears, showing itself as a low level output signal of the differential amplifier, and has a duration greater than 2 to 3 seconds, the delay circuit will then transmit the signal indicating overload to a second input terminal of the OR-circuit which then gives a high level signal which causes the disconnection of the load in the manner described above.

The principal advantage of the invention resides in the fact that it allows the current to be limited for short term overloads and the supply to be cut off in the case of prolonged overloading, or by external command, automatically and without the use of moving parts such as relays etc. On the other hand, the use of a simple ohmic resistance to absorb the excess energy during a short term overload, arising either from an increase in the potential of the supply or from a fall in the impedance of the load, means that the transistors are not required to withstand very high power and can thus be inexpensive.

We claim:

1. Device for overload protection of an electric power load comprising
    a low resistance and the controlled path of a first transistor switch means connected in series with each other and in series between a direct current supply and said load, with said low resistance located on the supply side of said transistor switch means,
    comparator switch means for producing a signal capable of maintaining said transistor switch means in transistor saturation condition so long as the voltage across said low resistance does not exceed a first predetermined voltage, but otherwise operating to open and to maintain open said transistor switch means,
    second transistor switch means having its conntrolled path in series with a protective resistance for said load, the series combination of said last mentioned controlled path and said protective resistance being connected in parallel with the controlled path of said first transistor switch means, and further comprising the improvement that:

control means are provided for switching on said second and then said first transistor switch means in rapid succession when it is desired to connect electric power to said load, for switching off said first and then said second transistor switch means in rapid succession when it is desired to disconnect electric power from said load, and for maintaining said second transistor switch means in transistor saturation condition during substantially the entire time for which said load is supplied with electric power through any of said transistor switch means, and automatic control means, including a timing circuit responsive to the duration of an output signal of said comparator switch means causing said first transistor switch means to be opened and maintained open as aforesaid, for causing said first-mentioned control means to disconnect electric power from said load when such an output of said comparator swtich means persists for a predetermined time period.

2. Device for overload protection as defined in claim 1 wherein said control means comprises first and second bistable flip flop circuits, first and second delay circuits, OR-gate means and first and second oppositely poled diode means, said first diode means being connected to pass a turn-on control pulse of a predetermined polarity to said first flip flop circuit to cause the output of said first flip flop circuit to put said second transistor switch means into transistor saturation condition, said second diode means being connected to pass a turn-off control pulse of polarity opposite to said predetermined polarity through said OR-gate means to reset said second flip flop circuit and thereby cause it to provide an output effective to switch off said first transistor switch means, said OR-gate means being also connected to said timing circuit of said automatic control means for resetting said second flip flop circuit in response thereto, said first delay circuit means being connected and constituted so as to set said second flip flop circuit a predetermined time after the setting of said first flip flop circuit, which time is at least as long as the time required to put said second transistor switch means into transistor saturated condition, said setting of said second flip flop circuit causing an output thereof to be effective to switch on said first transistor switch means, and said second delay circuit being connected and constituted so as to reset said first flip flop circuit a predetermined time after the resetting of said second flip flop circuit through said OR-gate, said last mentioned predetermined time being at least as long as the time required to switch off said first transistor switch means.

3. Device for overload protection as defined in claim 2 in which said comparator switch means is provided with a control input for enabling or disabling the provision by said comparator switch means of a signal capable of putting said first transistor switch means in transistor saturation condition, and in which, further, said second flip flop crcuit of said control means produces the switching on and switching off of said first transistor switch means by applying the output signal of said second flip flop circuit to said control input of said comparator switch means.

* * * * *